United States Patent [19]
Fuentes et al.

[11] Patent Number: 5,812,541
[45] Date of Patent: Sep. 22, 1998

[54] SIMPLIFIED WIRELESS SUBSCRIBER SYSTEM ADAPTED FOR CDMA RADIO TRANSMISSION

[75] Inventors: James Joseph Fuentes, South Barrington, Ill.; Alan Stuart Mulberg, Boulder; Charles Howard Parker, Adams County, both of Colo.

[73] Assignee: Lucent Technologies Inc., Murray Hill, N.J.

[21] Appl. No.: 640,591

[22] Filed: May 1, 1996

[51] Int. Cl.⁶ .................................................. H04J 13/02
[52] U.S. Cl. .......................... 370/335; 370/342; 370/522; 455/422
[58] Field of Search .................................. 370/328, 335, 370/338, 342, 522, 524; 455/422, 450

[56] References Cited

U.S. PATENT DOCUMENTS

| | | | |
|---|---|---|---|
| 5,195,090 | 3/1993 | Bolliger et al. | 370/337 |
| 5,438,565 | 8/1995 | Hemmady et al. | 370/352 |
| 5,440,613 | 8/1995 | Fuentes | 379/60 |
| 5,539,729 | 7/1996 | Bodnar | 370/346 |

*Primary Examiner*—Melvin Marcelo

[57] ABSTRACT

An arrangement for adapting a PCM (pulse code modulation) switch to control and communicate with a CDMA (code division multiple access) cell site for communication the wireless CDMA stations that communicate with that cell site. A protocol converter converts between signals for controlling integrated services digital network (ISDN) stations and signals for controlling a cell site, so that the cell site operates as if it were being controlled by a wireless switching center and the switch acts as if it were controlling ISDN stations. In the switch, a switchable connection is established between land based inputs and intermediate ports and a separate set of permanent connections is established between the intermediate ports and the PCM/packet converters. Advantageously, a switch designed to serve ISDN stations can be readily adapted to serve cell sites for serving wireless CDMA stations.

8 Claims, 3 Drawing Sheets

| PACKET CHANNEL ID. | CONVERTER ID. |
|---|---|
| ⋮ | ⋮ |
|  |  |

*FIG. 2*

SIMPLIFIED WIRELESS SUBSCRIBER SYSTEM ADAPTED FOR CDMA RADIO TRANSMISSION

TECHNICAL FIELD

This invention relates to methods and apparatus for offering cellular wireless service using code division multiple access (CDMA) radio signals, and more, specifically to small systems for offering such service.

PROBLEM

Code division multiple access (CDMA) is becoming the popular arrangement for offering cellular service because of its highly efficient use of the radio spectrum. With CDMA each conversation is spread over a large spectrum and individually decoded in such a way that other conversations occupying the same radio spectrum space do not interfere. Because no fixed unique portion of the spectrum is allocated to any one conversation, the speech signals for CDMA need only be sent when the customers are actually talking and are sent as efficiently coded digital speech packets. To communicate with land lines in which signals are transmitted as pulse code modulation (PCM) signals, a conversion between packetized speech signals, to be transmitted to wireless stations as CDMA signals, and the constant bit rate 64 kilobit PCM signals used to convey speech over land based lines (including point to point radio transmission such as microwave) must be made either at a switch or at a radio cell site. In general, the switch is the preferred solution since this means that the connection between the switch and the cell site need only carry the smaller bandwidth packetized speech signals. In one specific arrangement available from AT&T Network Systems, four PCM channels are used to carry the packets of fourteen CDMA telephone conversations.

Control of cell sites is a complex problem and the mobile telephone switching centers which typically control a large number of cell sites are large and complex. One solution to the problem of serving small cellular systems involving only a few cell sites is that disclosed in U.S. Pat. No. 5,440,613. This patent discloses arrangements wherein a private branch exchange (PBX) controls a cell site as if it were controlling a plurality of telephone stations, using a land based out of band telephone station control (OTSC) protocol such as that use for controlling integrated services digital network (ISDN) lines and sends its control signals to a protocol converter. The protocol converter converts between ISDN protocol signals and the signals required to control a cell site (and expected by that cell site). These latter signals are then sent to the cell site which treats the signals as if they had been received from a mobile telephone switching center. However, such an arrangement is not capable of controlling a cell site adapted to communicate with mobile stations by CDMA signals without a massive redesign of software and hardware.

A problem of the prior art, therefore, is that there is no satisfactory small cellular system capable of communicating with mobile stations via CDMA signals.

SOLUTION

The above problem is solved and an advance is made over the teachings of the prior art in accordance with applicants' invention wherein the PBX (or other switch) generates and receives PCM signals and these PCM signals are converted to packetized speech signals of a type used for communicating with CDMA stations.

The land side of the PBX generates signals as if they were to be terminated on ISDN (integrated services digital network) stations. In the preferred embodiment, these signals are switched on a per call basis by a PCM switch (in the preferred embodiment, this is a time division multiplex (TDM) bus) and terminated on an ISDN PRI (primary rate interface). The signals are then retransmitted to another interface for generating output PCM signals to be switched by the PCM switch to PCM/packet converters. The packet output of the converters is switched on a packet switch (in the preferred embodiment, this is a packet bus) to the packet transmission facility connecting the PBX to a CDMA cell site. In the converters of the preferred embodiment, fourteen PCM channels are converted into packetized signals which occupy four 64 kilobit channels of a PCM carrier system connecting the PBX to the cell site. The packetized signals are the digital signals transmitted by the cell site to a wireless station, from which this station can extract speech signals. Packetized signals in the reverse direction are converted into PCM signals for switching in the PBX.

The PBX routes incoming or outgoing land-based traffic by a switched connection to a channel of a first primary rate interface; the converters route traffic to or from the cell site by a permanent (provisioned) connection to a channel of a second primary rate interface; the two primary rate interfaces are wired together. From the point of view of the PBX, the first primary rate interface appears to be connected to a group of integrated services digital network (ISDN) lines; from the point of view of the cell site, the second primary rate interface appears to terminate the CDMA channels in a PCM channel connected to a PBX or switch. In accordance with the principles of the well-known frame relay protocol, each packet is identified by an indicator of the appropriate one of the fourteen channels for which the packet carries speech data; this identification is in the header of the packet.

The signaling channel connecting a protocol converter to the cell site, which already contains packetized signaling information, is sent over a separate PCM channel of the carrier facility connecting the cell site and PBX, and is routed to the protocol converter which generates ISDN type D-channel signals for use by the PBX control. The signals sent over that signaling channel identify the group of fourteen and the member within that group of each conversation. The protocol converter converts between the original PCM channel number (used by the PBX) and the group and member number of the PCM/packet converter (used by the cell site). The association between these two is permanent in the sense that a particular PCM channel is always routed to the same group and is always treated as being a particular member of this group. Advantageously, using this arrangement, the PBX in conjunction with the protocol converter can control the cell site as if the individual CDMA channels were individual ISDN lines.

In one preferred embodiment, the converter units have their packetized output connected to and switched by a packet bus (a packet switch) that is already a part of the PBX. The output of this packet bus is then switched in groups of four channels to the PCM facility connecting the PBX to the cell site. PCM signals are switched over a time division multiplex (TDM) bus (a PCM switch) of the PBX.

BRIEF DESCRIPTION OF DRAWING

FIG.2 is a memory layout diagram of data stored in an interface between the cell site and the PBX switch.

DETAILED DESCRIPTION

Figure 1:
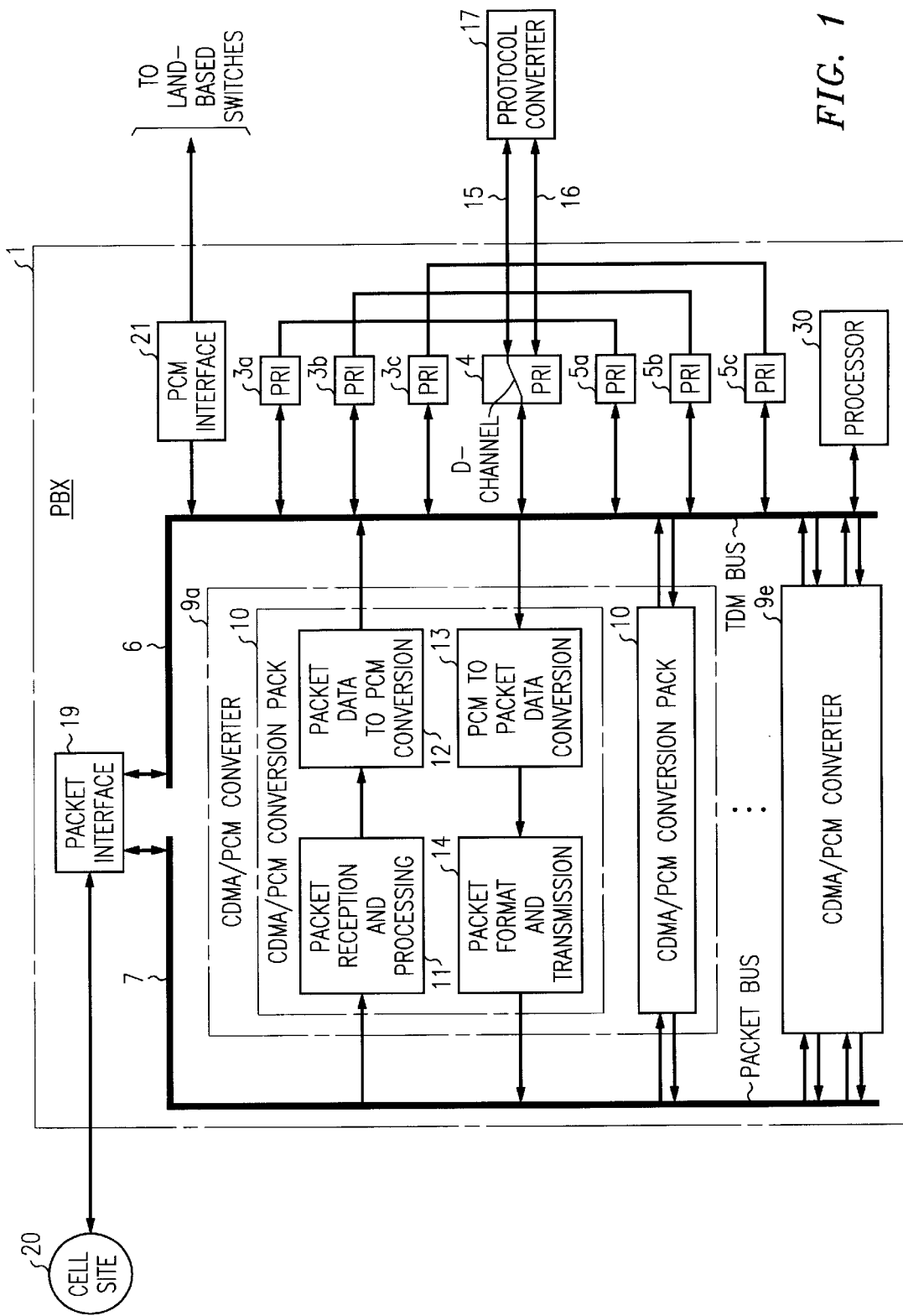
FIG. 1 is a block diagram of a PBX switch adopted to control a CDM cell site.

FIG.1 is a block diagram illustrating the operation of applicant's invention. PBX 1 is a PBX such as the DEFINITY® Communication System manufactured by AT&T Global Business Communication Systems. As previously mentioned, PBX 1 has equipment to perform the conversion between packets and PCM signals. From the point of view of the control processor 30 of the PBX, PBX 1 is simply a PBX arranged to control a plurality of ISDN stations connected to the PBX through a PRI. In accordance with the teachings of the previously cited patent, a protocol converter 17 receives the D-channel signals (control messages) sent by the PBX control processor 30 as if it were controlling ISDN stations and converts these control messages sent toward these stations into control messages for controlling a cell site. These latter control messages are then forwarded to the cell site and are used to control the cell site. Similarly, cell site originated control messages are transmitted to the protocol converter which converts them into data messages of the type returned from ISDN stations to processor 30 over the D-channel of a PRI (primary rate interface). The object of the architecture of applicant's invention is to convert the arrangement described in the cited patent, which allows a PBX arranged for controlling ISDN stations to control a cell site essentially without making changes in the software of the PBX, into an arrangement for controlling a CDMA cell site.

The conventional part of PBX 1 is a switch which is adapted as in the prior art to serve ISDN lines connected via a primary rate interface (PRI). The PRI normally carries twenty-three conversations and one signaling channel, but may carry twenty-four conversations if the signaling channel for these conversations is carried over another facility; in this embodiment PRIs 3a, 3b, and 3c could each carry 24 conversations, since the non-associated signaling channel for these PRIs is carried over PRI 4, as discussed below. (This description is in terms of the US Standard T-Carrier. The same principles can be applied to the use of the European 32 Channel E-Carrier systems). In a conventional PBX, the outputs of PRIs 3a, 3b, and 3c, whose inputs are connected to time division multiplex (TDM) bus 6, would be connected to ISDN telephones. Instead, in accordance with applicants' invention, the outputs of the PRI 3a, 3b, 3c, whose inputs are connected conventionally via TDM bus 6 through the PBX to the land based facilities, are connected to the outputs of three non-associated signaling facility PRI units 5a, 5b, 5c. The input of the latter interfaces is connected to TDM bus 6 which distributes 70 of the 72 channels of 5a, 5b, and 5c to 5 packet/PCM converter units 9a, . . . , 9e. Each of the packet/CDMA converter units takes signals from 14 channels on the TDM bus and converts these into packets for use with CDMA. The packets for the fourteen channels are concentrated onto four 64 kilobit PCM channels for transmission to the cell site. The packet/PCM converters are connected to packet bus 7 which switches and transmits the packets to a carrier interface 19 for transmission to the cell site 20.

While the above description has been in terms of signals from a land based facility to a cell site, the reverse signals are transmitted over the same paths.

The signaling channel, for carrying signals originating as LAPB format packet signals in the cell site 20, is transmitted via TDM bus 6 to a primary rate interface PRI 4 for transmission as a LAPB format packet signal to the protocol converter 17. The protocol converter converts between signaling messages in ISDN type D-channel format originating or terminating in PBX control processor 30 for use by the PBX and signals in the LAPB format for use by to the cell site. Signals from the protocol converter 17 to the control processor 20 of the PBX are sent via the signaling channel (D-channel) of PRI 4.

A speech path from a channel on the cell site 20 to a channel of interface 21 connected to a land based switch will now be described. Cell site 20 is arranged to receive CDMA signals from wireless stations and to forward these CDMA signals to the PBX 1. Internally within cell site 20, five groups of 14 channels of CDMA signals are converted into packets, each group of packets being transmitted over a group of 4 channels of the 24 channel T-carrier facility connecting cell site 20 with an interface 19. The interface 19 has outputs for 20 channels connected to a packet switch, i.e., packet bus 7 which is a local area network (LAN) in the preferred embodiment. One of the remaining 4 channels is connected to time division multiplex (TDM) bus 6; this channel is used for transmitting the LAPB signals which are the control signals between the cell site and the protocol converter 17. Connected to the packet bus 7 is a group of 5 packet/PCM converters 9a, . . . , 9e, each for converting between the packets of 14 conversations (transmitted over 4 channels of the T-carrier signal between cell site 20 and interface 19) and 14 PCM streams. The 5 groups of 14 PCM streams are transmitted to TDM bus 6 whence they are received in 70 of the channels of the 3 primary rate interfaces (PRI) 5a, 5b, 5c. The 3 primary rate interfaces, 5a, 5b, 5c, are hard wired to another set of 3 primary rate interfaces 3a, 3b, 3c respectively. All of the connections established over one of the buses 6 or 7 discussed so far are permanently provisioned connections established in control memories (not shown) for controlling busses 6 and 7, at initialization time, that remain indefinitely and are not changed from call to call. The switchable connections are those between an interface 21, connected to land based switches, and the 3 primary rate interfaces 3a, 3b, 3c. These connections are established through TDM bus 6 under the control of processor 30 in essentially the same way as processor 30 would control connections between an external (incoming or outgoing) call and an ISDN line connected to one of the 3 primary rate interfaces, 3a, 3b, 3c.

Protocol converter 17 receives control messages from and transmits control messages to a LAPB channel transmitted over one of the B channels of PRI 4 for the controlling the cell site and receives control messages from and transmits control messages to the D channel of PRI 4 connected to the PBX for communicating with the PBX control processor 30. Protocol converter 17 is connected to the D channel of PRI 4 for over the wired connection 15 and the D channel of PRI 4 is then transmitted via TDM bus 6 to processor 30. The LAPB control channel is transmitted from protocol converter 17 over wired connection 16 to a B channel of PRI 4 and is then transmitted over the TDM bus 6 directly to interface 19. Interface 19 combines the LAPB signal with the 20 channels of packetized signals from packet bus 7 to create a signal for the T-1 carrier facility interconnecting interface 19 and cell site 20.

Packet bus 7 already exists in PBX 1 and its use for transmitting packets from interface 19 to packet/PCM converters 9 is simply a matter of assigning additional addresses for this purpose. Similarly, TDM bus 6 already exists in the PBX and the connection between PRIs 5a, 5b, 5c, and packet/PCM converters 9 is merely a matter of assigning PCM ports (i.e. PCM time slots) for this purpose. Processor 30 is initialized to have a permanent connection (5 time slots) to the TDM bus; this connection is used for the D channel connection between processor 30 and PRI 4. Additional provisioned connections are used for the connection between PRIs 5 and packet/PCM converters 9 over the TDM bus. Provisioned (semi/permanent) connections are provided for the packet bus 7 between interface 19 and the packet/PCM converters 9.

Having established these essentially permanent connections, the PBX is ready to complete calls to the cell site and individual channels of that cell site corresponding to wireless mobile stations simply by establishing switched connections to a channel of one of the PRIs 3. PRI 4 is used to establish a permanent connection for a D-channel from processor 30 to protocol converter 17 and for a B channel for the LAPB signal from the cell site 20 to protocol converter 17. PRI 4 has permanent connections to ports on the TDM bus as does interface 19 to pick up the LAPB signal.

Interface 19, which contains a table of the fixed correspondence between internal converter addresses and CDMA channel identifications, automatically inserts into the header the internal address of a converter corresponding to the CDMA channel of a packet received from the cell site, for use in switching the packet on packet bus 7, and strips the internal address of the converter from the header of a packet received from packet bus 7. Similarly, units 13 and 14 of the converters 9, which also store these correspondences, automatically insert into the header an internal address of the appropriate channel of the converter, for use in switching the packet onto packet bus 7, and unit 11 strips the internal address from the header prior to converting to the PCM format.

Figure 2:
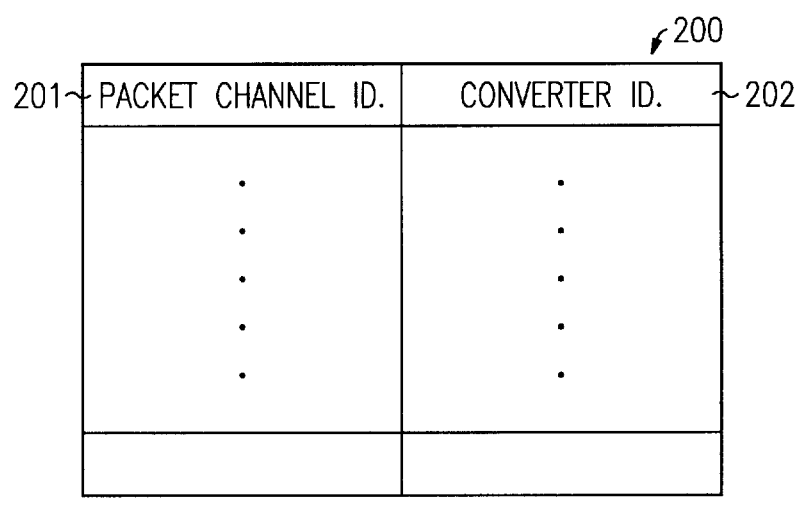

The packet/PCM converter will now be described in greater detail. A converter for converting between the CDMA packets of 14 communications and PCM signals of these same 14 communications is shown in block 9a. It includes 2 packet/PCM conversion packs 10 each for converting between CDMA packets and PCM signals for 7 communications. In the direction from packet to PCM, a packet reception and processing unit 11 has an output which is delivered to packet/PCM converter 12 whose outputs are connected to TDM bus 6. Similarly, PCM/packet converter 13 receives inputs for 7 communications from TDM bus 6 and transmits packet data to packet format and transmission unit 14 which delivers packets to packet bus 7. These packets are then transmitted from bus 7 to interface 19 which transmits these packets over a T-1 carrier facility to cell site 20 where the packets are used to generate CDMA signals for transmission to the CDMA mobile stations FIG.2 illustrates a table maintained in interface 19 for converting between a packet channel identification used for communicating with the cell site and a converter identification used for steering a packet with a particular address to the converter specified. This table establishes the one to one correspondence between converters and member numbers and packetized channels. The one to one relationship between converters and member numbers and channels on the primary rate interfaces 3a, 3b, and 3c is established through the permanent connections between the converters and the primary rate interfaces 5a, 5b, 5c, in conjunction with the wired connection between primary rate interfaces 5a, 5b, 5c, and 3a, 3b, and 3c.

Figure 3:
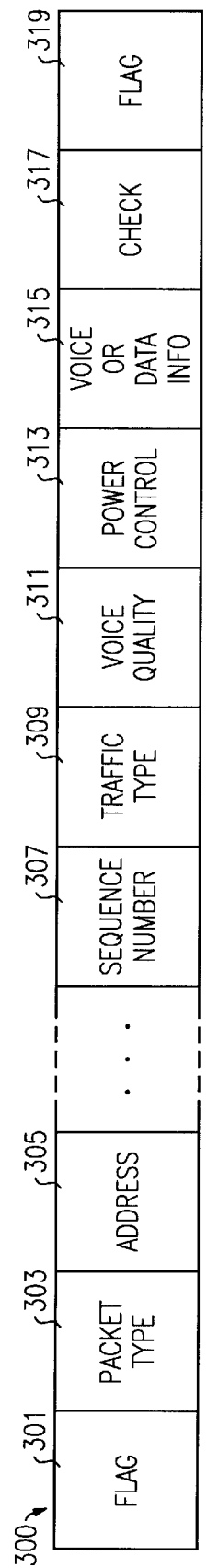
FIG.3 is a diagram illustrating the layout of a digitized speech packet transmitted between the PBX switch and the cell site.

FIG.3 is a layout of a packet used for communications between switch and the cell site. Block 300 is one such packet which starts with a flag 301 and indication of the packet type 303. The information in blocks 305 to 315 is level 3 information used for the actual communications between the interfaces from the switch and from the cell site. Block 305 is used to specify the address which corresponds to the packet channel identification 202 of FIG.2. Block 307 indicates the sequence number of a particular packet and is used to insure that packets are being received in the proper sequence and to initiate error treatment if they are not. Block 309 indicates the traffic type, which is used for distinguishing among voice, data and DTMF (dual tone multifrequency) signaling tones. Block 311 is used to indicate the voice quality that is being received; this is used to select a preferred packet during a handover of a call between two cell sites or antennas of one cell site. Block 313 is used to control the level of the power of speech signals to minimize interference between strong and weak signals by limiting power transmitted between stations and the cell site when the two are close. Block 315 contains the data of the voice or, in some cases, the data communication. Block 317 includes a check sum to verify the integrity of the entire packet. 319 represents a terminal flag; in this preferred embodiment a terminal flag is used but in other embodiments, this flag can be used also as the beginning flag of the next packet.

We claim:

1. A wireless telecommunications switch for communicating between a land-based line and a wireless CDMA (code division multiple access) cell site for communicating with wireless CDMA stations, comprising:

a plurality of PCM/packet signal converters;

PCM switching means for switching PCM signals; and protocol conversion means for converting between cell site control protocol messages, said cell site control protocol for signaling to and receiving signals from a wireless cell site, and an OTSC (out of band telephone station control) protocol;

said switch connectable to a CDMA cell site by a plurality of communication links;

said switch connectable to said CDMA cell site by data link means, connected to said protocol conversion means;

wherein said switch sends OTSC protocol signaling messages, as if it were controlling land based lines, to said protocol conversion means, and said protocol conversion means converts said OTSC protocol signaling message to cell site control protocol signaling messages, for transmission to said cell site, for controlling said cell site;

wherein said protocol conversion means receives cell site control protocol signaling messages, said cell site control protocol signaling messages essentially the same as messages for controlling a wireless switching center, and said protocol conversion means converts said cell site control protocol signaling messages to OTSC protocol signaling messages for transmission to said switch;

wherein a connection between an external land based line and a wireless CDMA cell site comprises:

a permanent connection connectable between said PCM switching means and an external facility for carrying a signal from said line;

a connection switched on a per call basis by said PCM switching means to a first PCM interface;

a permanent connection between said first PCM interface and a second PCM interface; and a permanent connection between said second PCM interface and one of said PCM/packet signal converters; and a connection between the one PCM/packet signal converter and a channel of one of said plurality of communication links;

wherein said one PCM/packet signal converter is connectable to a channel to said cell site.

2. The system of claim 1 further comprising:

packet switching means;

wherein said connection between said one PCM/packet signal converter and a channel of one of said plurality of communication links is established over said packet switching means.

3. The system of claim 2 wherein said connection established over said packet switching means is a permanent connection.

4. The system of claim 2 wherein said switch is a PBX (private branch exchange) switch.

5. The system of claim 2 further comprising interface means for connecting said packet switching means to said plurality of communication links;

wherein a voice channel is identified by a cell site identification and a packet switching address; and wherein said interface means includes data for translating between said packet switching address of a channel and said cell site identification of a channel.

6. The system of claim 5 wherein said interface means inserts said packet switching address into packets received from said cell site and strips said packet address from packets received from said packet switching means.

7. The system of claim 1 wherein said OTSC protocol is an ISDN (integrated services digital network) protocol.

8. The system of claim 1 wherein said PCM switching means comprises a TDM (time division multiplex) bus.

* * * * *